United States Patent [19]

Larsen et al.

[11] 3,881,173

[45] Apr. 29, 1975

[54] CONDITION CODE DETERMINATION AND DATA PROCESSING

[75] Inventors: Dee E. Larsen, San Jose; Michael R. Clements, Santa Clara, both of Calif.

[73] Assignee: Amdahl Corporation, Sunnyvale, Calif.

[22] Filed: May 14, 1973

[21] Appl. No.: 360,392

[52] U.S. Cl. .......... 340/172.5; 340/172.5

[51] Int. Cl. .......... G06f 7/00

[58] Field of Search .......... 340/172.5

[56] References Cited

UNITED STATES PATENTS

| | | | |
|---|---|---|---|
| 3,234,519 | 2/1966 | Scholten | 340/172.5 |
| 3,544,973 | 12/1970 | Borck, Jr. et al. | 340/172.5 |
| 3,629,853 | 12/1971 | Newton | 340/172.5 |

*Primary Examiner*—Gareth D. Shaw
*Assistant Examiner*—Paul R. Woods
*Attorney, Agent, or Firm*—Flehr, Hohbach, Test, Albritton & Herbert

[57] ABSTRACT

Disclosed is a digital data processing system comprised of a main store unit, a storage control unit including a buffer store, a channel unit, an instruction unit, an execution unit and a console unit. The system is controlled by instructions which operate upon data to carry out desired data manipulations. A group of instructions form a program in which the instructions are sequentially executed. Certain of the instructions provide for branching depending upon whether or not a condition has been satisfied. The condition is set in a condition code depending upon the type of instructions and particular operands prior to the complete execution of the instructions by the execution apparatus.

32 Claims, 3 Drawing Figures

CONDITION CODE DETERMINATION AND DATA PROCESSING

CROSS REFERENCE TO RELATED APPLICATIONS

1. DATA PROCESSING SYSTEM HAVING AN INSTRUCTION PIPELINE FOR CONCURRENTLY PROCESSING A PLURALITY OF INSTRUCTIONS, Ser. No. 302,221, filed Oct. 30, 1972, invented by Gene M. Amdahl, Glenn D. Grant, and Robert M. Maier, assigned to Amdahl Corporation.

2. OPERAND COMPARATOR, Ser. No. 360,331, filed May 14, 1973, now U.S. Pat. No. 3,825,895, invented by Michael R. Clements and Dee E. Larsen, assigned to Amdahl Corporation.

BACKGROUND OF THE INVENTION

The present invention relates to the field of instruction-controlled digital computers and specifically, to the processing of conditional instructions, such as the instruction BRANCH ON CONDITION (BC) as defined by OS/360 architecture.

Instruction-controlled digital computers operate upon data to carry out desired data manipulations. A group of instructions form a program where the program normally has its instructions sequentially executed, one or more at a time, to carry out a complete data manipulation.

Instructions in data processing systems which involve branches as a function of the state of a condition code are an important part of the data procssing system and the method and apparatus by which these instructions are processed are important factors in the cost and performance of the system because such instructions are statistically common instructions in programs.

When branch instructions (e.g. BRANCH ON CONDITION) are fetched for processing, they require the interrogation of a condition code (CC) which is stored within the PSW register to determine which of two instruction streams will be thereafter followed. The condition code is desirably determined and set prior to the processing of the branch instruction because if it is not, processing of the instructions may be delayed until the condition code is set. Any delay in instruction processing, of course, deleteriously affects the performance of the data processing system. In prior art data processing systems, programs are typically written so that the instruction which sets the condition code for interrogation by a subsequent branch instruction does so at the earliest possible time. In this way, the execution of the condition setting instruction is completed so as not to delay the branch instruction processing. In many programs, however, it is impossible to arrange the stream of instructions such that the condition code setting instruction will have completed execution prior to the time that it is desirable to process the branch instruction or instructions subsequent to the branch instruction.

The problem of delay in setting condition codes becomes even more critical in high-speed data processing systems where instructions in a stream are prefetched or are preprocessed since there is less time to make instructions available for processing when the system is ready for them.

SUMMARY OF THE INVENTION

The present invention is a method and apparatus for use in a data processing system wherein the condition code upon which a branch instruction acts is set as a function of the instruction and a related comparison of the particular operands being manipulated by the instruction. The condition code setting is independent of the time at which the execution of the condition code setting instruction is completed. The criteria for comparing the operands is determined by a decode of the instruction which is being executed.

In accordance with one aspect of the present invention, means are provided within the execution unit for decoding the OP code of an instruction and controlling a comparator within the execution unit for selecting an appropriate comparison criteria for comparing the operands. The operands are concurrently gated into the comparator and a determination is made as to whether or not to set the condition code. The condition code is set within one cycle of the data processing system, or two cycles for double word processing, independently of how many execution cycles are required for a complete execution of the instruction. If, when a branch instruction interrogates the condition code latch, the condition is such that the branch is to be taken, the branch instruction immediately causes the instruction processing pipeline to be cleared of any instructions in the non-taken instruction stream and commences immediately to process instructions in the to be taken instruction stream.

In one particular embodiment of the present invention, each instruction is a sequence which includes the one-cycle segments PFO for prefetch offset, IA for instruction address formation, IB1 for instruction buffer access initiation, IB2 for instruction buffer access completion, D for instruction decoding, R for reading operand address data, OA for operand address formation, OB1 for operand buffer access initiation, OB2 for operand buffer access completion, E1 for execution initiation, E2 for execution completion, CK for checking and W for writing. While that sequence contains only two execution segments, namely E1 and E2, many instructions require additional E2 execution cycles. For example, the segments after the E1 segment for a typical plural E2 instruction sequence are E1, E2, E2, E2, E2, CK, W.

In accordance with the present invention, the condition code determination is made during the E1 cycle of the condition code setting instruction so that the number of E2 cycles is immaterial. For double word processing, the condition code determination is made during the first E2 cycle. Any subsequent branch instruction can, therefore, be processed at least as soon as the E1 segment of the previous instruction. Accordingly, a target instruction stream, that is, the instruction stream which is followed if the branch is indicated, can be entered any time after the E1 cycle of the previous instruction.

In accordance with the present invention, the target instruction is addressed prior to the E1 cycle of the previous instruction which may be a time prior to the time when the condition code is set. Although the targeted instruction is addressed that instruction is only accessed from storage if the condition code indicates that the branch be taken. If the condition code is such that the branch is to be taken, the accessing of the targeted instruction overrides the non-branch instruction stream. However, if the condition code specifies the non-branch to be taken, the targeted instruction is never accessed from storage and the non-branch instruction stream is processed.

In accordance with the above summary, the present invention achieves the objective of providing a system method and apparatus wherein branch instructions are executed by the setting of condition codes by comparing operands with a criteria established by decoding the instruction whereby instruction processing continues after a branch instruction along the instruction stream specified by the branch instruction.

Additional objects and features of the invention will appear from the following description in which the preferred embodiments of the invention have been set forth in detail in conjunction with the drawings.

DETAILED DESCRIPTION

Overall System

Figure 1:
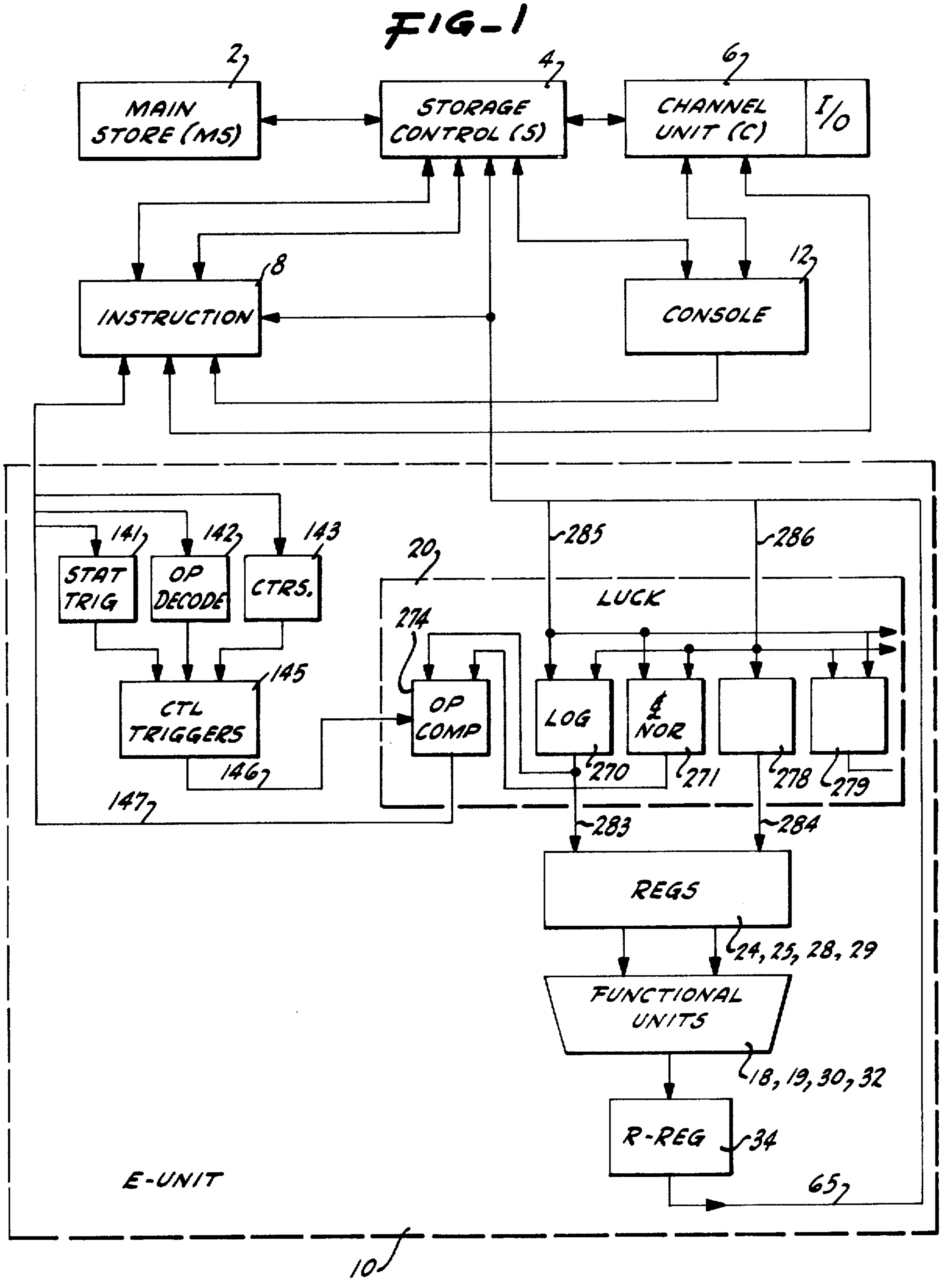
FIG. 1 depicts a block diagram of the data processing system which sets condition codes and processes branch instructions in accordance with the present invention.

In FIG. 1, the data processing system of the present invention is shown to include a main store 2, a storage control unit 4, an instruction unit 8, an execution unit 10, a channel unit 6 with associated I/O and a console 12. The system of FIG. 1 operates under control of instructions where an organized group of instructions form a program. Instructions and the data upon which the instructions operate are introduced from the I/O equipment via the channel unit 6 through the storage control unit 4 into the main store 2. From the main store 2, instructions are fetched by the instruction unit 8 through the storage control 4 and are processed so as to control the execution within the execution unit 10. The system of FIG. 1 is, for convenience, compatible with the IBM System/360 and accordingly, general details as to the operation of data processing systems may be had by reference to the following publications: "IBM System/360 Principles of Operation," IBM Systems Reference Library, Form A22–6821. "Introduction to IBM System/360 Architecture," IBM System Reference Library C20–1667. "A Programmer's Introduction to the IBM Systems/360 Architecture, Instructions, and Assembler Language, " IBM Systems Reference Library C20–1646. "IBM System/370 Principles of Operation," IBM Systems Reference Library GA22–7000.

The above publications are hereby incorporated by reference into this specification for the purpose of teaching the general operation of data processing systems, for identifying nomenclature, and for defining the architectural requirements of the Systems/360 and 370.

By way of introduction, the information format in the above data processing systems organizes 8 bits into a basic building block called a "byte." Each byte also typically includes a 9th bit for parity used in error detection. Although express mention of the 9th bit in each byte is not generally made throughout this specification, it is assumed that there is a parity bit associated with each byte and that the normal parity checking circuitry is included throughout the system in a well-known manner.

Two bytes are organized into a larger field defined as a half-word, and 4 bytes or 2 half-words are organized into a still larger field called a word. Two words form a double word. A word is 4 consecutive bytes. While these definitions are employed in the specification, it will be understood that words or bytes can equal any number of bits.

Various data formats may be employed in the environmental system so that instructions and operands may be of different length depending upon the particular operation which is to be carried out. The instruction formats include RR, RX, RS, SI, and SS. As a typical example, the RX instruction includes an 8-bit OP code, a 4-bit R1 code, a 4-bit X2 code, a 4-bit B2 code and a 12-bit D2 code. The OP code specifies one out of a possible 256 instructions. The R1, X2 and B2 fields each identify one of 16 general registers. The D2 field contains a displacement number between 0 and $2^{12}$. As an example of the RX instruction, the ADD instruction adds the contents of the register identified by the R1 field to the contents of the main storage location addressed by the sum of the number in the D2 field added to the contents of the register identified by the X2 field again added to the contents of the register identified by the B2 field. The result is placed in the register identified by the R1 field. The RX instructions require two accesses to storage for execution, one to fetch the instruction and one to fetch one of the two operands. RR instructions require one storage access while SS instructions require three or more.

Execution Unit

Still referring to FIG. 1, the E-unit 10 includes a plurality of functional units indicated generally as 18, 19 30 and 32 as well as a functional unit indicated as LUCK unit 20. Data enters the E-unit 10 through the LUCK unit 20 via the input buses 285 and 286. The input data is operated upon to form a result in the registers generally indicated as 24, 25, 28 and 29. Thereafter data in the registers 24 through 29 is gated through one or more of the other functional units 18, 19, 30, 32 to form a result in the R register 34. Further details of the LUCK unit 20 are described in connection with FIG. 2 hereinafter. Additionally, the E-unit 10 includes as part of its control status triggers 141, an OP decoder 142 and various counters 143 for controlling timing within the data processing system. The OP decoder 142 is connected to receive the current instruction being processed from the instruction unit 8 at a time specified by the counters 143 provided an appropriate status trigger 141 indicates that a condition code determination should be made in the current processing cycle. Those triggers 141, decoder 142 and counters 143 are operative to set appropriate control triggers 145 for controlling, via line 146, the comparison to be carried out by the operand comparator 274 in the LUCK unit 20. If the comparison of the operands input to the LUCK unit 20 indicates that the condition code is to be set to indicate a branch, an output signal from comparator 274 is supplied via line 147 to the I-unit 8 where that signal causes the instruction processing controls to select the targeted instruction from storage unit 4 for transmission to the instruction unit 8.

Figure 2:
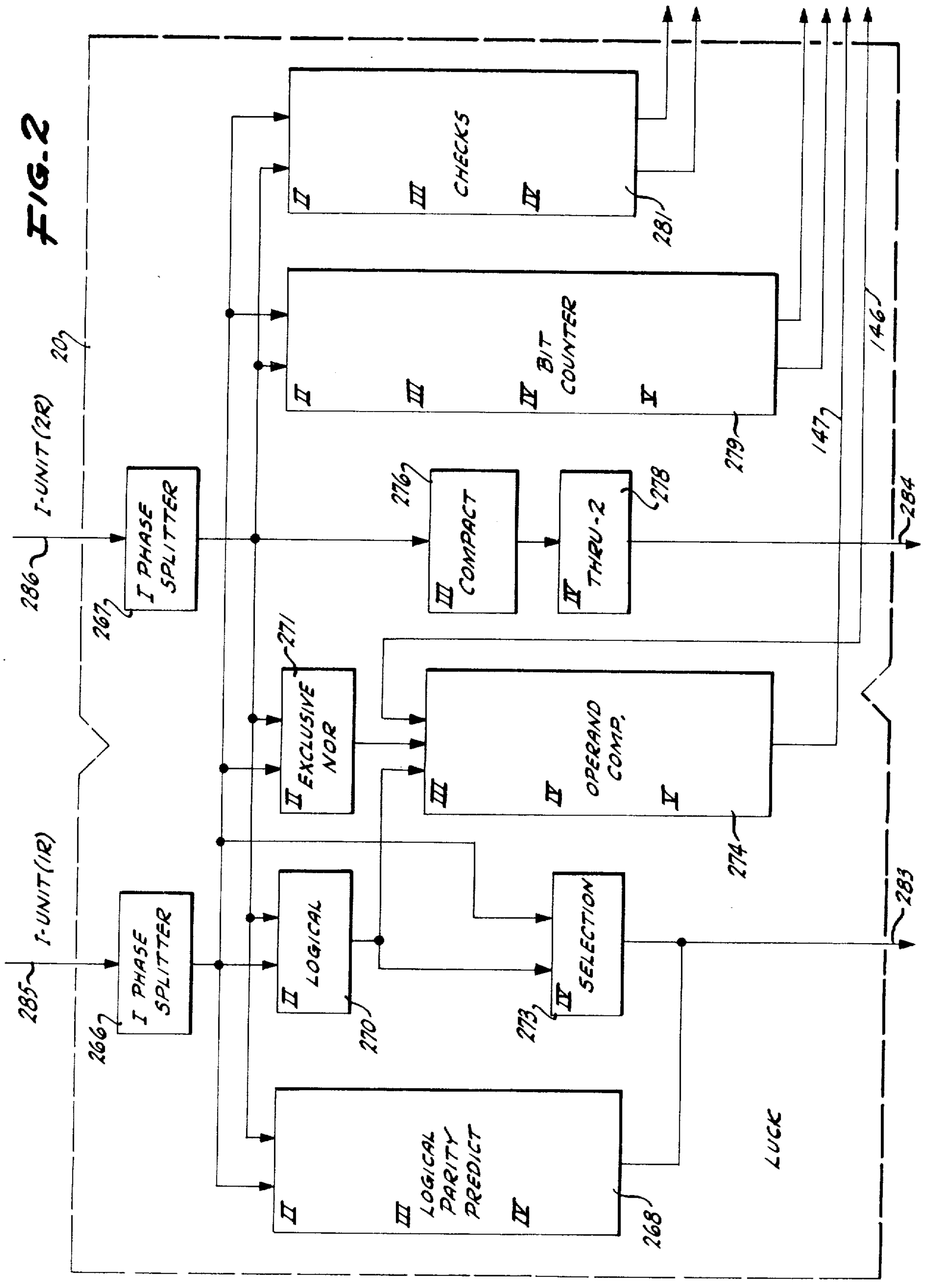
FIG. 2 depicts a schematic representation of the control circuitry which selects the criteria for the comparison of operands and compares operands for setting the condition code.

Referring to FIG. 2, further detail of the LUCK unit 20 which forms a part of the E-unit 10 of FIG. 1 is shown. Specifically, the LUCK unit 20 is operative to carry out logical operations, comparisons, counts and checking functions on operands input on 32-bit buses 285 and 286. Unit 20 includes five levels of logic and a plurality of data paths with outputs representing the indicated functions. The first level of logic includes conventional phase-splitters 266 and 267 which form bipolar signals from the unipolar input signals on buses 285 and 286. The outputs from the phase-splitters 266 and 267 are to several data paths. One data path is through the logic block 270. Logic block 270 is operative to perform logical AND and logical OR functions on the input operands providing an output on bus 283. Another data path gates, via gates 273, the input on bus 285, via phase-splitter 266, directly through to output 283 without any logical operation. The logic block 270 comprises a second level of logic while the selection gates 273 appear in the equivalent of a fourth level of logic (no third level is actually present, however). In a similar manner, the input operand from phase splitters 266 and 267 can be gated through another data path comprising the EXCLUSIVE-NOR gates 271 and thereafter through the comparator 274.

Comparator 274 performs a number of comparisons. Comparator 274 performs a comparison specified by input control lines 146. Specifically, comparator 274 includes means for detecting whether the operand from input bus 285 is greater than, less than or equal to the operand input on bus 286. Other comparison criteria are included within comparator 274. The greater than, less than and equal determinations are typically carried out for negative operands by detecting which operand has the highest order zero following the highest order one within the operand.

The compact circuit 276 is employed for altering the data format of input operands and alternatively that data path is employed without energization of the compact circuit 276 for gating the input operand on bus 286 directly to the output bus 284.

The bit counters 279 are employed for counting, for example, the number of leading zeros in determining the amount of shift required for alignment of operands in floating point operations. The checks in circuit 281 are used for detecting errors.

The operations performed in the LUCK unit 20 may be carried out using well known techniques and apparatus. In the system of FIG. 1 for fixed point arithmetic positive numbers are in binary notation and negative numbers are in 2's complement notation. For floating point arithmetic, the first high order bit denotes the sign, the next 7 bits denote an exponent and the remaining 24 bits denote a fraction.

In a preferred embodiment, the operand comparisons in comparator 274 employ unique methods and apparatus. A first one of the two operands is input to the operand comparator circuitry 274 via the first phase-splitter 266 and thereafter through either the circuitry 270 or the circuitry 271. The second operand is input to the circuitry 274 through the phase-splitter 267 and again through the unused one of the circuits 270 or 271. The two input operands are compared in circuitry 274 bit by bit. Each bit in one operand, from most to least significant, is compared with the respective bit in the other operand and the results are interpreted in accordance with a number of rules.

First considering fixed point arithmetic, under the conditions where the operands OP1 and OP2 input to circuitry 274 are either both positive or both negative, the rules of comparison are summarized in TABLE I as follows:

TABLE I (Both Positive or Both Negative Operands)

| | FIRST "DIFF" BIT POSITION | OP1 | OP2 | COMP |
|---|---|---|---|---|
| Case 1 | None | Pos | Pos | OP1 = OP2 |
| Case 2 | None | Neg | Neg | OP1 = OP2 |
| Case 3 | Yes | Pos-1 | Pos-0 | \|OP1\| > \|OP2\| |
| Case 4 | Yes | Pos-0 | Pos-1 | \|OP1\| < \|OP2\| |
| Case 5 | Yes | Neg-1 | Neg-0 | \|OP1\| > \|OP2\| |
| Case 6 | Yes | Neg-0 | Neg-1 | \|OP1\| < \|OP2\| |

Referring to TABLE I, the column labelled FIRST "DIFF" BIT POSITION signifies whether or not any condition of inequality (i.e. "DIFF" or difference) is detected in the bit-by-bit comparison of the first and second operands input to the circuitry 274. The "FIRST" bit position in which an inequality exists is that position determined by commencing with the highest order bit and proceeding toward the lowest order bit making a bit-by-bit comparison for equality.

The column labelled OP1 signifies whether or not the operand OP1 is positive (Pos) or negative (Neg) and whether or not the first "DIFF" bit for OP1 is a 1 or a 0 as indicated by the postscripts 1 or 0.

The column OP2 signifies the same information for the second operand OP2 as does the OP1 column for the first operand.

The column COMP signifies the relationship between (OP1) and (OP2) when the conditions in each of the other three columns is existent. The comparison relationship of OP1 and OP2 is a magnitude comparison.

Referring specifically to cases 1 and 2 in TABLE I, the conditions indicated are that each bit in OP1 is identical to the corresponding bit in OP2. Under these conditions for either both positive or both negative operands, OP1 is equal to OP2.

In TABLE I, cases 3 and 4 the conditions indicated are that both operands are positive. When both operands are positive, the first bit position in the equality determination where the first inequality occurs controls which operand is greater. Specifically, that operand which has a 1 in the first inequality position in greater than the other operand which has a 0 in the corresponding bit position.

In TABLE I, cases 5 and 6, the conditions indicated are that both operands are negative. The operand having the 0 in the first inequality location is greater than the other operand which has 1 in the corresponding bit position.

Still considering fixed point arithmetic, under the conditions where the operands OP1 and OP2 input to the circuitry 274 are of opposite sign (i.e. one positive and one negative), the rules of comparison are summarized in TABLE II as follows:

TABLE II (One Positive and One Negative Operand)

| | FIRST "SAME" BIT POSITION | ALL LOWER ORDER BITS | OP1 | OP2 | COMP |
|---|---|---|---|---|---|
| Case 1 | None | | Pos | Neg | $\lvert OP1\rvert < \lvert OP2\rvert$ |
| Case 2 | None | | Neg | Pos | $\lvert OP1\rvert > \lvert OP2\rvert$ |
| Case 3 | 0 | | Pos | Neg | $\lvert OP1\rvert < \lvert OP2\rvert$ |
| Case 4 | 0 | | Neg | Pos | $\lvert OP1\rvert > \lvert OP2\rvert$ |
| Case 5 | 1 | | Pos | Neg | $\lvert OP1\rvert \geq \lvert OP2\rvert$ |
| Case 6 | 1 | | Neg | Pos | $\lvert OP1\rvert \leq \lvert OP2\rvert$ |
| Case 7 | 1 | 0 | Pos | Neg | $OP1 = OP2$ |
| Case 8 | 1 | 0 | Neg | Pos | $OP1 = OP2$ |

In considering TABLE II, the positive operand (POS) is in straight binary notation and the negative operand (NEG) is in 2's complement notation. As before, the operands are compared for equality on a bit-by-bit basis with the order running from the highest order bit toward the lowest order bit. While the order of comparison is logically from high to low the actual comparison is preferably carried out in parallel and simultaneously on a time basis. In the case of TABLE II, the comparison is carried out in order to detect the first identity (both 1's or both 0's) as indicated by the column FIRST "SAME" BIT POSITION.

Referring to TABLE II, cases 1 and 2 represent the conditions where none of the bits in corresponding positions are the same. Under those conditions, the absolute value of the positive operand is less than the absolute value of the negative operand.

Referring to cases 3 and 4 in TABLE II, the conditions indicated are that the first position having identical bits is one in which those bits are 0's. Under those conditions, the absolute value of the positive operand is less than the absolute value of the negative operand.

Referring to cases 5 and 6 in TABLE II, the conditions indicated are that the first position having identical bits is one in which those bits are 1's. Under those conditions, the absolute value of the positive operand is greater than or equal to the absolute value of the negative operand.

Referring to cases 7 and 8 in TABLE II, the conditions indicated are that the first position having identical bits is one in which those bits are 1's with the further conditions that all lower order bits following that 1 are 0's. Under those conditions, the positive and negative operands are equal.

Now considering normalized floating point arithmetic, the rules of comparison are the same as those given above in TABLE I for positive operands with the exception that the first bit in each floating point operand is treated separately since that bit is the sign bit. The comparison is valid for the first 7 bits specifying the exponent as well as being valid for the remaining 24 bits specifying a fraction. No consideration is required as to whether a fraction or exponent bit is the first difference bit position detected in the equality search.

In summary, the operand comparison circuitry 274 functions to compare the magnitude of OP1 and OP2 for both normalized floating point and fixed point arithmetic and for positive and negative operands employing the same general rules of comparison. Note that the search for equality (identity) used in connection with the TABLE II operations is the inverse of the search for equality (non-identity) used in connection with the TABLE I operations.

In addition to the magnitude comparison discussed in connection with TABLE I and TABLE II, the operand comparator 274 also functions to detect overflow conditions in connection with the addition and substraction of operands without actually adding or substracting the operands. An instruction which specifies operations with two operands will produce a sum in the case of addition or a difference in the case of substraction which exceeds the capacity of the data processing system. While one way to detect whether or not an overflow occurs is to actually execute the specified instruction and then detect whether in fact an overflow occurs, a preferred method, in accordance with the present invention, is carried out by a comparison of the operands and a decode of the operation code of the add or substract instruction.

The format rules in a typical system for the operands is the same as previously described in connection with TABLE I and TABLE II. In fixed point arithmetic, positive numbers are in binary notation and negative numbers are in 2's complement notation. The first, or higher-order, bit is the sign bit which is 0 for positive and 1 for negative numbers.

The overflow detection is first described in connection with addition where operands OP1 and OP2 are added in accordance with an instruction. Operands OP1 and OP2 are input to the comparator of FIG. 2 and the rules of operation in the case of addition are summarized in TABLE III as follows:

TABLE III (Addition Overflow)

| | FIRST "SAME" BIT POSITION | OP1 | OP2 | OVERFLOW |
|---|---|---|---|---|
| Case 1 | None | Pos | Pos | No |
| Case 2 | 0 | Pos | Pos | No |
| Case 3 | 1 | Pos | Pos | Yes |
| Case 4 | None | Neg | Neg | Yes |
| Case 5 | 0 | Neg | Neg | Yes |
| Case 6 | 1 | Neg | Neg | No |
| Case 7 | None, 1, 0 | Neg | Pos | No |
| Case 8 | None, 1, 0 | Pos | Neg | No |

In TABLE III, the operands OP1 and OP2 are compared for the equality relationship of identity on a bit-by-bit basis running from the highest-order bit toward the lowest-order bit. The column labelled FIRST "SAME" BIT POSITION signifies whether or not a bit in one operand is the same (identity) as the corresponding bit in the other operand.

In case 1, the equality relationship of identity is not detected in any corresponding bit positions and with both operands positive, no overflow condition exists.

In case 2, the equality relationship of identity for the first corresponding bits detected is 0's and with both operands positive, no overflow exists.

In case 3, the first identity bits are 1's and with both positive operands, an overflow condition is detected.

In case 4, no identity is found in corresponding bits and with both negative operands, an overflow condition exists.

In case 5, the first identity bits are 0's and with both negative operands, an overflow exists.

In case 6, the first identity bits are 1's and for both negative operands, no overflow condition exists.

In cases 7 and 8, under any equality relationship for one negative and one positive operand, no overflow condition exists.

The overflow detection by comparator circuitry 274 in FIG. 2 for substraction of OP2 from OP1 is carried out in accordance with the rules summarized in the following TABLE IV:

TABLE IV

| | FIRST "DIFF" BIT POSITION | OP1 | OP2 | OVER-FLOW |
|---|---|---|---|---|
| Case 1 | None | Pos | Neg | Yes |
| Case 2 | None | Neg | Pos | No |
| Case 3 | Yes | Pos-1 | Neg-0 | Yes |
| Case 4 | Yes | Pos-0 | Neg-1 | No |
| Case 5 | Yes | Neg-1 | Pos-0 | No |
| Case 6 | Yes | Neg-0 | Pos-1 | Yes |
| Case 7 | Yes | Pos | Pos | No |
| Case 8 | Yes | Neg | Neg | No |

The comparison of operands OP1 and OP2 is carried out with a bit-by-bit comparison from higher-order bits to lower-order bits ignoring the high-order sign bit. For substraction, the equality relationship sought is non-identity, that is, the first occurrence of a difference between the corresponding bits in OP1 and OP2.

In case 1 of TABLE IV, the equality relationship is not found since none of the corresponding bits exhibit a difference and under the conditions where OP1 is positive and OP2 is negative, an overflow condition exists.

In case 2, no difference is found, the equality relationship of non-identity does not exist and with OP1 negative and OP2 positive, no overflow condition exists.

In case 3, the equality relationship is found with a positive 1 for OP1 and a negative 0 for OP2 which produces an overflow condition.

In case 4, the equality relationship is found with a positive 0 for OP1 and a negative 1 for OP2 which does not produce an overflow condition.

In case 5, the equality relationship is found with a negative 1 for OP1 and a positive 0 for OP2 which does not produce an overflow condition.

In case 6, the equality relationship is found with a negative 0 for OP1 and a positive 1 for OP2 which produces an overflow condition.

In case 7, the equality relationship is found with both OP1 and OP2 positive which does not produce an overflow condition.

In case 8, the equality relationship is found with both OP1 and OP2 negative which does not produce an overflow condition.

TABLES I, II, III and IV define the logical comparisons performed by the operand comparator circuitry 274 of FIGS. 1 and 2. The comparisons, whether for magnitude comparison or overflow determination, employ a common comparison technique. That technique is a bit-by-bit comparison of the bit positions of each operand to detect a pre-determined equality relationship. The equality relationship is the first identity or non-identity in corresponding bits examined from higher-order toward lower-order. The criteria for interpreting the comparison of the operands is given in the above four tables. The criteria are the signs of the operands (positive or negative), the type or arithmetic (floating point or fixed point), the value (1 or 0) of the first bit position having the identity relationship, and the nature of the operation to be executed (add, substract, compare, etc.).

While the comparison performed by circuitry 274 is preferably like that described in the above tables, other comparisons for setting the condition code may be employed within the scope of the present invention.

Referring now specifically to FIG. 1, the four output lines 147 from comparator 274 carry four signals CONDITION CODE VALID, CONDITION CODE 0, CONDITION CODE 1, and CONDITION CODE 3. If the CONDITION CODE VALID line is energized and none of the other three lines are energized, then by default a CONDITION CODE 2 signal is implied. The lines 147 connect from comparator 274 to the instruction unit 8 where they are input to the pipeline 350 logic for controlling the proper processing of instructions in accordance with the present invention.

Further details of the operand comparator circuitry 274 are described in the application entitled OPERAND COMPARATOR, Ser. No. 360,331, filed May 14, 1973, now U.S. Pat. No. 3,825,895, invented by MICHAEL R. CLEMENTS and DEE E. LARSEN and assigned to Amdahl Corporation which is hereby incorporated by reference into the present specification.

Instruction Unit

Figure 3:
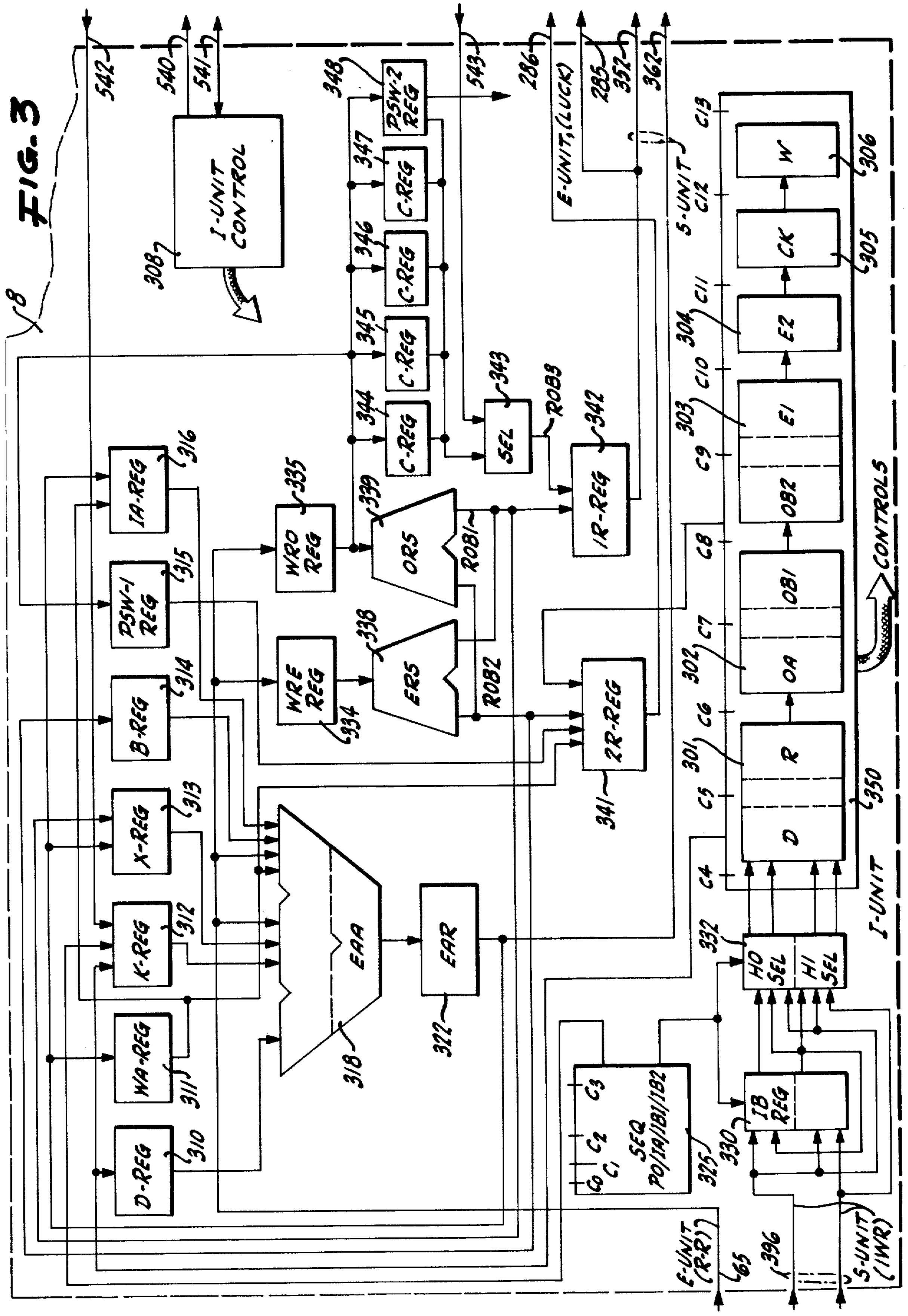
FIG. 3 depicts a schematic representation of the instruction processing apparatus which process instructions and which controls the branching to a target instruction stream when an appropriate condition code is set.

In FIG. 3, the instruction (I) unit 8 of FIG. 1 is shown in detail. The I-unit 8 includes a plurality of addressing registers. The addressing registers include the 32-bit D register 310 for storing the displacement D1 or D2 obtained from the various instruction fields, the 32-bit WA register 311 for storing a working address, the 32-bit K register 312 for storing an address constant K, the 32-bit X register 313 for storing the X1 or X2 field of the instruction, the 32-bit B register 314 for storing the contents of the register identified by the B field, and a 24-bit 1A register 316 for storing the instruction in storage address. During the initial instruction fetching sequence, the 1A register 316 stores bits 40 through 63 of the 64-bit PROGRAM STATUS WORD (PSW). Bits 32 through 39 of the PSW are stored in the PSW-1 register 315. Bits 0 through 31 of the PSW are stored in the PSW-2 register 348.

The addressing registers are connected with inputs to the effective address adder 318 which functions to add selected ones of the contents of the addressing registers to form an effective address which is input to the effective address register (EAR)322. The effective address stored in the register 322, in addition to providing inputs back into the addressing registers, is connected as an input to the storage control unit 4 and specifically, to the buffer address register (BAR)363 via bus 262.

From the register 363, the effective address addresses the high-speed buffer (HBS)355 to access the desired instruction. The accessed instruction is one word in length and is stored in the IW register 388 from where it is gated into the instruction buffer IB register 330 or directly via the selection gates 332 into the instruction pipeline 350.

For use in generating the appropriate addresses and loading the addressing registers and for storing operands and other information the I-unit 8 includes an even register stack (ERS)338 and an odd register stack (ORS)339. Each of the stacks 338 and 339 includes four 32-bit scratch pad registers, and eight 32-bit general purpose registers for a total of eight scratch pad registers and 16 general purpose registers. Additionally, the even and odd stacks 338 and 339 each include four 32-bit registers which together define four 64-bit floating point registers. The outputs from each of the registers in the stacks 338 and 339 are connected via appropriate gates to readout bus ROB1 and to readout bus ROB2. Bus ROB1 is connected as an input to the 1R register 342 and bus ROB2 is connected as an input to the 2R register 341. The 1R register 342 and the 2R register 341 have their outputs connected via buses 285 and 286 to the execution unit 10 as inputs to the LUCK unit 20 and the IR register also has to output connected to the storage control unit 4 via bus 352 as an input to the store data select gates 386. The buses ROB1 and ROB2 from the register stacks 338 and 339 also serve as inputs to the addressing registers. In order to gate information into the registers of the stacks 338 and 339, the result register RR in the execution unit 10 connects as an input to the write even WRE register 334 and the write odd WRO register 335, which connect as inputs to the even register stack 338 and the odd register stack 339, respectively. Additionally, the write odd register 335 has its output connected as an input to the control registers 334 through 348.

The output from the control registers 344 through 348 are through selection gates 343 the output of which is the readout bus ROB3 which in turn is connected as an input to the IR register 342. The register 344 through 348 provide a means whereby the control functions generally derived from the pipeline 350 insert their control conditions into the data stream of the data processing system.

The instruction fetch and the instruction presentation portions of the instruction sequence are segments PFO, IA, IB1 and IB2. The initial sequence processing is carried out under the control of the sequencer 325 in FIG. 3. The sequencer 325 controls the sequential instruction fetching, determines the next sequential instruction and determines the target instruction fetching. After the prefetch offset (AFO), the sequential instruction fetching processing of sequencer 325 is in one of four states, the IA state, the IB1 state, the interlock state, or the wait state. The states are determined by logical determinations responsive to priority and other control signals in the data processing system.

The next sequential instruction selection is carried out by the sequencer 325 to select whether the next instruction inserted into the pipeline 350 is obtained from the instruction word IW register 388, from the S-unit of FIG. 5, or whether the next instruction is derived from the instruction buffer IB register 330. The determination by sequencer 325 of which instruction is the next to be gated into the pipeline 350 is responsive to various control signals generated throughout the data processing system.

The target fetch (TF) determines which instruction is to be gated into the IW or IB registers as a candidate for the next instruction to be gated into the instruction pipeline 350. The target fetch is responsive to various control signals generated throughout the data processing system.

The logic circuitry for controlling the states in sequencer 325 are implemented using standard data processing techniques. For example, the sequencer is typically a serial counter which determines that instructions are fetched in a sequential counting order until the ordered sequence is interrupted, for example, by a branch instruction. Such techniques are well known in the data processing field.

The initial segments PDO, IA, IB1, IB2 of the instruction sequence are processed under control of the sequencer 325 in FIG. 3. Sequencer 325 operates over the cycles C0, C1, C2 and C3. The prefetch offset segment PFO is carried out during time C0 to C1 which is one clock period and one cycle of the data processing system. During the PFO segment, the IA register 316 is loaded with an incremented address while the other registers 310 through 315 are appropriately loaded and latched at time C1.

During the address formation, IA segment, the registers 310 through 316 are appropriately gated into the effective address adder EAA 318 which adds up to three inputs to form an effective address which is gated into the effective address register EAR 322 where that address is latched at time C2. During the instruction buffering segment IB1, the effective address from register 322 is gated via bus 362 to the buffer address register BAR 363 which is in the S-unit of FIG. 5. The register 363 is latched at time C3. The latching of data at time C3 is effective to address the high-speed buffer (HBS)355. During the buffering segment IB2 the addressed information is accessed from the buffer 355 and is latched in the instruction word IW register 388 at time C4.

At time C4, the data is introduced into the pipeline 350. Pipeline 350 includes the register and control stages 301, 302, 303, 304, 305, and 306. The stages 301, 302 and 303 each are active for two segments. Those stages each store pipeline information and generate control signals during two cycles of the data processing system for each instruction. The stages 304, 305, and 306 are each active for one segment and each stores pipeline information and generates control signals during one cycle of the data processing system for each instruction.

The instruction pipeline 350 in FIG. 3 includes registers for storing the pipeline information in each of the stages 301 through 305. The first stage 301 is latched at time C6 after the decoding of the D segment and the reading of the R segment. The D segment is active for the cycle from clock pulse C4 to clock pulse C5 and the R segment for the cycle between pulses C5 and C6. The D and R segments use the information stored in the IB register 330 of FIG. 3 or IW register 388 of FIG. 5. The data is latched into the registers 330 or 338 at the clock pulse time C4 and remains there until transferred and latched in the stage 301 register at C6. The stage 302 associated with the segments OA and OB1 includes a register which is latched at clock period C8 with the same information shifted out from the register of stage 301.

Similarly, stage 303 receives information from the register in the stage 302 and is operative over the clock periods from C8 to C10. At time C10, the information in the pipeline received from stage 302 is latched in the register in stage 303. During two clock periods from C8 to C10, the segments OB2 and E1 of the instruction stream are active to develop control signals for the system. After being latched at time C10 in the stage 303 register, the pipeline information is employed in the performance of the E2 segment for the period from C10 to C11 and is latched in the register of stage 304 at time C11. The information latched in the register of stage 304 is employed for the period from C11 to C12 to generate control signals to perform the check segment of the instruction sequence. At clock pulse C12, the stage 304 information segment becomes latched in the register of stage 305. Finally, information in the register of stage 305 is used during the W segment, during the period from C12 to C13 to generate control signals for writing information. Thereafter, the information in the pipeline 350 is discarded and is no longer retained.

OPERATION

The operation of the data processing system of FIG. 1 is given with reference to the following CHART I. In that chart, two examples of instruction stream processing are shown. In the first example, BRANCH NOT TAKEN, up to seven instructions, I(1), I(2) . . . I(7), are concurrently processed. The instructions have a two cycle offset in processing by the I-unit of FIG. 3. In the BRANCH NOT TAKEN example, instruction I(2) has its prefetch offset (PFO) segment two cycles later than the PFO segment of instruction I(1). Similarly, all of the instructions in the stream I(1) through I(7) are two cycles offset.

In a typical example, instruction I(1) is a condition code setting instruction in which the condition code is set before completion of the E1 segment of I(1). Since the instruction stream continues I(1), I(2) . . . I(7) without branching to the target stream T(1), T(2), etc., then the PFO segment of instruction I(6) is processed during the same time as the E2 segment of instruction I(1). Instructions I(3) through I(5) are being processed by the instruction unit of FIG. 3 at the time the PFO segment of I(6) is processed. Instruction I(6) is the first instruction which is not undergoing processing prior to the time that the E1 segment of the I(1) instruction is completed.

CHART I

BRANCH NOT TAKEN

| | | | | | | | | | | | | | | | | | | | | | | | | |
|---|---|---|---|---|---|---|---|---|---|---|---|---|---|---|---|---|---|---|---|---|---|---|---|---|
| I(1) | PFO | IA | IB1 | IB2 | D | R | OA | OB1 | OB2 | E1 | E2 | CK | W | | | | | | | | | | | |
| I(2) | | | PFO | IA | IB1 | IB2 | D | R | OA | OB1 | OB2 | E1 | E2 | CK | W | | | | | | | | | |
| I(3) | | | | | PFO | IA | IB1 | IB2 | D | R | OA | OB1 | OB2 | E1 | E2 | CK | W | | | | | | | |
| I(4) | | | | | | | PFO | IA | IB1 | IB2 | D | R | OA | OB1 | OB2 | E1 | E2 | CK | W | | | | | |
| I(5) | | | | | | | | | PFO | IA | IB1 | IB2 | D | R | OA | OB1 | OB2 | E1 | E2 | CK | W | | | |
| I(6) | | | | | | | | | | | PFO | IA | IB1 | IB2 | D | R | OA | OB1 | OB2 | E1 | E2 | CK | W | |
| I(7) | | | | | | | | | | | | | PFO | | | | | | | | | | | |

BRANCH TAKEN

| | | | | | | | | | | | | | | | | | | | | | | | | |
|---|---|---|---|---|---|---|---|---|---|---|---|---|---|---|---|---|---|---|---|---|---|---|---|---|
| I(1) | PFO | IA | IB1 | IB2 | D | R | OA | OB1 | OB2 | E1 | E2 | CK | W | | | | | | | | | | | |
| I(2) | | | PFO | IA | IB1 | IB2 | D | R | OA | OB1 | OB2 | E1 | E2 | CK | W | | | | | | | | | |
| I(3) | | | | | PFO | IA | IB1 | IB2 | D | R | OA | | | | | | | | | | | | | |
| I(4) | | | | | | | PFO | IA | IB1 | IB2 | D | | | | | | | | | | | | | |
| I(5) | | | | | | | | | PFO | IA | IB1 | | | | | | | | | | | | | |
| I(6) | | | | | | | | | | | | | | | | | | | | | | | | |
| T(1) | | | | | | | | | | | IWR | D IBR | R | OA | OB1 | OB2 | E1 | E2 | CK | W | | | | |
| T(2) | | | | | | | | | | | | IWR | IBR | D | R | OA | OB1 | OB2 | E1 | E2 | CK | W | | |
| T(3) | | | | | | | | | | | | PFO | IA | IB1 | IB2 | D | R | OA | OB1 | OB2 | E1 | E2 | CK | W |

In the BRANCH TAKEN example of CHART I, instruction I(1) is the condition code setting instruction and instruction I(2) is the branch instruction which interrogates as to whether or not a condition code indicating a branch was set. The condition code indicating a branch is set prior to completion of the E1 segment of the I(1) instruction. Accordingly, rather than processing the PFO segment of the I(6) instruction, as was done in the BRANCH NOT TAKEN example, the BRANCH TAKEN example commences fetching the target instruction T(1) during the E2 segment of the I(1) instruction. The I(2) branch instruction includes an R segment in which the stack register 338 and 339 of FIG. 3 are read to load the appropriate ones of the working registers 310 through 316 with the information necessary to form the address of the first target instruction T(1) whether or not that instruction is actually required at a later point in time. The address of the target instruction is formed by the effective address register 318 during the OA segment of instruction I(2). During the OB1 segment of instruction I(2), the effective address register 322 has its contents communicated to the storage unit (not shown, see above-identified application DATA PROCESSING SYSTEM HAVING AN INSTRUCTION PIPELINE FOR CONCURRENTLY PROCESSING A PLURALITY OF INSTRUCTIONS) where it is latched into the buffer address register (not shown). Since the branch is to be taken, the address of the T(1) instruction is accessed and stored in the instruction word register (not shown) during the OB2 segment of the I(2) instruction. Note that the I(6) instruction which would, except for the branch, have been processed is not processed. During the subsequent segment, the contents of the IWR register are transferred into the instruction buffer register 330 so that the D segment of the T(1) instruction is entered during the check segment of the I(1) instruction while simultaneously the address of the T(2) instruction is accessed from storage unit while the PFO segment of instruction T(3) is being processed. During the next R segment of the T1 instruction, the contents of the IWR register for instruction T(2) are transferred into the instruction buffer register 330 while the instruction T(3) is concurrently processed for segment IA. Thereafter processing of the instructions T(1), T(2) and T(3) is carried out in the same manner as processing in the BRANCH NOT TAKEN example. Subsequent instructions to the T(3) instruction have the standard format, like instruction T(3) and are like all of the instructions I(1) through I(7) of the BRANCH NOT TAKEN example.

A specific example of the BRANCH TAKEN condition of CHART I is carried out in connection with any of the cases described in TABLES I, II, III and IV.

A BRANCH TAKEN example of CHART I occurs in the following manner. Typically, the condition code-setting instruction I(1) is a compare instruction for comparing the magnitude of OP1 and OP2. If either OP1 or OP2 was determined in the instruction immediately preceding instruction I(1), then of course, the condition code-setting instruction could not be placed earlier in the instruction stream. The compare instruction I(1) is able to compare OP1 and OP2 within the time between two successive instructions in the instruction processing unit and hence the present data processing system need not wait for the comparison before deciding to branch during instruction I(2). In many data processing systems, however, comparison instructions are performed employing successive additions or substractions which require a plurality of cycles within the execution unit. In such systems, the present invention would save execution time.

Another example wherein a magnitude comparison of OP1 and OP2 is required occurs, for example, when programmers use an iterative routine of substracting a fixed quantity from an initial number thereby reducing the number to some pre-determined value. Such iterative loops end whenever the number, for example OP1, is reduced below a pre-determined value, for example OP2. The present invention operates, for example, each time a substraction is executed to compare OP1 and OP2 and, if OP2 exceeds OP1, to set the condition code causing the branch to be taken and the iteration to be terminated. If OP1 and OP2 are floating point operands, for example, each substraction can take a plurality of cycles of the execution unit. In the present invention, many cycles are saved because the operand comparison is carried out so as to enable the setting of the condition code without waiting for execution of the substraction.

An example of a comparison of two floating point operands in accordance with TABLE I, case 4, is given as follows where OP1 is + ½ × $16^{-63}$ and where OP2 is + ¾ × $16^{-63}$:

```
OP1   0   0...01,   100...0,   0...0,   0...0
OP2   0   0...01,   110...0,   0...0,   0...0
                    ↑───── FIRST "DIFF"
```

A fixed point arithmetic example from TABLE II, case 3, is given where OP1 is +2 in binary notation and OP2 is −4 in 2's complement notation as follows:

```
OP1   0   0...0010
OP2   1   1...1100
                 ↑────────── FIRST "SAME"
```

An example of TABLE III, case 3, for a fixed point add instruction is given for OP1 having the value + 1.610612736 × $10^9$ and for OP2 having the same value as follows:

```
OP1         0   110...0,   0...0,   0...0,   0...0
OP2         0   110...0,   0...0,   0...0,   0...0
                ↑───── FIRST "SAME"
OP1 + OP2   1   100...0,   0...0,   0...0,   0...0
            ↑───────── OVERFLOW
```

An example of TABLE IV, case 6, for a fixed point substract instruction is given for OP2 having a value + 1.610612736 × $10^9$ substracted from OP1 having a value −2.147418113 × $10^9$:

```
OP1         1     000...0,   0...0,   1...1,   1...1
OP2         0     110...0,   0...0,   0...0,   0...0
                  ↑───── FIRST "DIFF"
OP1 - OP2   1,0   010...0,   0...0,   1...1,   1...1
            ↑↑──────── OVERFLOW
```

An overflow exists in the TABLES III and IV examples because the maximum negative number (32 0's) is −2.147483648 × $10^9$ and the maximum positive number is +2.147483647 × $10^9$.

While the invention has been particularly shown and described with reference to preferred embodiments thereof it will be understood by those skilled in the art that various changes in form and details may be made therein without departing from the spirit and the scope of the invention.

What is claimed is:

1. A data processing system having storage apparatus, instruction handling apparatus and instruction execution apparatus, and operative in response to instructions having operation codes for specifying operations to be executed and having operand fields for identifying operands to be utilized in executing the operations, and additional apparatus comprising, instruction sequence processing means for processing instructions including a branch instruction specifying one of a plurality of possible instruction streams to be taken in accordance with a condition code specified by said branch instruction, and including a condition code-setting instruction specifying operands to be utilized in executing the condition code-setting instructions, comparator means for comparing the operands specified by said condition code-setting instruction to form a comparison result, means responsive to the operation code of said condition code-setting instruction in said instruction sequence processing means and to said comparison result in said comparator means for setting said condition code without the necessity of waiting for the execution of the operation specified by the operation code of said code-setting instruction.

2. The data processing system of claim 1 wherein said comparator means includes means for comparing said operands on a bit-by-bit basis to detect the first bit position, from high-order to low-order, having a pre-determined equality relationship.

3. The data processing system of claim 1 where said instruction sequence processing means includes a plurality of stages, means for introducing a plurality of segmented instructions into said stages with a time-offset between instructions equal to an integral number of clock cycles, and wherein each of said instructions includes a plurality of one-cycle segments, said segments including PFO for prefetch-offset formation, IA for instruction address formation, IB1 for instruction buffer access initiation IB2 for instruction buffer access completion, D for instruction decoding, R for reading address data, OA for operand address formation, OB1 for operand buffer access initiation, OB2 for operand buffer access completion, E1 for execution initiation, E2 for execution completion, CK for checking, W for writing, and wherein said means responsive includes means is operative to set said condition code at the completion of said E1 cycle.

4. The data processing system of claim 1 wherein said instruction execution apparatus includes a first functional unit for comparing said operands during one cycle of said data processing system and includes a second functional unit for executing instructions over a subsequent one cycle of the data processing system, said time-offset of instructions in said instruction sequence processing means being equal to the cycle time for data manipulations in said first and second functional units.

5. The data processing system of claim 2 wherein said pre-determined equality relationship is identity of bits.

6. The data processing system of claim 2 wherein said pre-determined equality relationship is non-identity of bits.

7. The data processing system of claim 3 wherein said instruction sequence processing means includes first and second register means for storing a first operand and a second operand specified by said condition code-setting instruction, and including means for storing the operation code of said condition code-setting instruction.

8. A data processing system having storage apparatus, instruction handling apparatus and instruction execution apparatus, and additional apparatus comprising, instruction sequence processing means for processing instructions in an instruction stream including a branch instruction specifying a branch point wherein, at said branch point, the instruction stream branches to a targeted path of instructions if a condition code specified by the branch instruction is set or follows a non-branch path of instructions if said condition code is not set and wherein the condition code is set or not set responsive to a condition code-setting instruction contained within the instruction stream at a point prior to said branch point, said condition code-setting instruction including fields specifying an operation code and the location of first and second operands to be processed in the manner defined by the operation code, comparator means for comparing the first and second operands of the code-setting instruction to detect equality relationships, control means including decoder means for decoding the operation code of said code-setting instruction to select a pre-determined equality relationship in said comparator means for responsively controlling the setting of the condition code.

9. The data processing system of claim 8 wherein said operands are positive or negative and are expressed in floating point or fixed point arithmetic and wherein said comparator means includes means for comparing each bit in one of said operands with the corresponding bit in the other of said operands in order to detect the first occurrence, proceeding from the highest order toward the lowest order bits, of a pre-determined equality relationship.

10. The data processing system of claim 8 wherein said instruction sequence processing means includes a plurality of stages, means for introducing a plurality of segmented instructions into said stages with a time-offset between instructions equal to an integral number of clock cycles, and wherein each of said instructions includes a plurality of one-cycle segments, said segments including PFO for prefetch-offset formation, IA for instruction address formation, IB1 for instruction buffer access initiation, IB2 for instruction buffer access completion, D for instruction decoding, R for reading address data, OA for operand address formation, OB1 for operand buffer access initiation, OB2 for operand buffer access completion, E1 for execution initiation, E2 for execution completion, CK for checking, W for writing, and wherein said control means includes means operative to set said condition code at the completion of the E1 cycle of the code-setting instruction.

11. The data processing system of claim 10 wherein the instruction execution apparatus includes said comparator means as a first functional unit for comparing said operands during one cycle of said data processing system and includes a second functional unit for executing instructions over a subsequent one cycle of the data processing system, said time-offset of instructions in said instruction sequence processing means being equal to the cycle time for data manipulations in said first and second functional units.

12. The data processing system of claim 8 wherein, for operands in fixed point arithmetic, said equality relationship is identity of bits when one of said operands is positive in binary notation and the other of said operands is negative in 2's complement notation.

13. The data processing system of claim 8 wherein, for operands in fixed point arithmetic, said equality relationship is non-identity of bits when both operands are positive in binary notation or both operands are negative in 2's complement notation.

14. The data processing system of claim 8 wherein, for operands in floating point arithmetic, said equality relationship is non-identity of corresponding bits excluding the sign bits.

15. The data processing system of claim 13 wherein the comparator means functions to determine that the first and second operands are equal if all corresponding bits in each operand are identical.

16. The data processing system of claim 13 wherein, for positive operands, the absolute value of the operand having a 1 in the first non-identical bit position is greater than the absolute value of the operand having a 0 in the corresponding bit position.

17. A data processing system of claim 13 wherein, for negative operands, the absolute value of the operand having a 0 in the first non-identical bit position is greater than the absolute value of the operand having a 1 in the corresponding bit position.

18. The data processing system of claim 14 wherein the absolute value of the operand having a 1 in the first non-identical bit position is greater than the absolute value of the operand having a 0 in the corresponding bit position.

19. The data processing system of claim 12 wherein none of the corresponding bits are identical, the absolute value of the positive operand is less than the absolute value of the negative operand.

20. The data processing system of claim 12 wherein, if the first identical corresponding bits are 0's the absolute value of the positive operand is less than the absolute value of the negative operand.

21. The data processing system of claim 12 wherein, if the first identical corresponding bits are 1's, the absolute value of the positive operand is greater than or equal to the absolute value of the negative operand.

22. The data processing system of claim 12 wherein, if the first identical corresponding bits are 1's and all lower-order bits are 0's, the positive operand is identically equal to the negative operand.

23. A data processing system having storage apparatus, instruction handling apparatus and instruction execution apparatus where said instruction handling apparatus includes instruction processing means for processing instructions of an instruction stream wherein, at a branch point, the instruction stream branches to a targeted path if a condition code is set or follows a non-branch path if a condition code is not set and wherein the condition code is set or not responsive to a condition code-setting instruction contained within the instruction stream prior to the branch point, said condition code-setting instruction including fields specifying an operation code and the location of first and second operands to be processed in the manner specified by the operation code to execute the code-setting instruction, said operands being positive or negative and expressed in floating point or fixed point arithmetic, said instruction sequence processing means including a plurality of stages, means for introducing a plurality of segmented instructions of the instruction stream into said stages with a time-offset between instructions equal to an integral number of clock cycles and wherein each of the instructions includes a plurality of one-cycle segments, said segments including PFO for prefetch-offset formation, IA for instruction address formation, IB1 for instruction buffer access initiation, IB2 for instruction buffer access completion, D for instruction decoding, R for reading address data, OA for operand address formation, OB1 for operand buffer access initiation, OB2 for operand buffer access completion, E1 for execution initiation, E2 for execution completion, CK for checking and W for writing, said system further including, comparator means for comparing the first and second operands of the code-setting instruction on a bit-by-bit basis to detect the first bit position, from high-order to low-order, having a pre-determined equality relationship of identity for one positive and one negative operand and having a predetermined equality relationship of non-identity for both operands positive or both operands negative in fixed point arithmetic and for all operands in floating point arithmetic, and decoder and control means for selecting the predetermined equality relationship of identity on non-identity by decoding the operation code of the condition code-setting instruction.

24. In a data processing system having a storage apparatus, instruction handling apparatus and instruction execution apparatus and operative in response to instructions having operation codes for specifying operations to be executed and having operand fields for identifying operands to be utilized in executing the operation codes, the method comprising the steps of, processing instruction sequences including a branch instruction specifying one of a plurality of possible instruction streams selected in accordance with a condition code specified by said branch instruction and including a condition code-setting instruction for setting said condition code and specifying operands to be utilized in executing the condition code-setting instruction, setting the condition code by comparing the operation code of said condition code-setting instruction and comparing the operands specified in said code-setting instruction without the necessity of waiting for the execution of the operation code in said code-setting instruction.

25. The method of claim 24 further including the steps of, comparing each bit in one of said operands with the corresponding bit in the other of said operands in order to detect the first occurrence of a predetermined equality relationship proceeding from the highest-order toward the lowest-order bits.

26. The method of claim 25 further including the steps of, decoding the operation code of the condition code-setting instruction to select the predetermined equality relationship.

27. The method of claim 26 further including the steps of comparing said first and second operands on a bit-by-bit basis to detect the first bit position, from highest-order toward lowest-order, to detect non-identity if said operation code indicates that said first and second operands are in floating point arithmetic, to detect non-identity if said operation code indicates said first and second operands are both positive or are both negative and are in fixed point arithmetic, and to detect identity if said operation code indicates said operands are in fixed point arithmetic and one operand is positive and the other operand is negative.

28. The data processing system of claim 8 wherein the setting of the condition code signifies a magnitude comparison of the first and second operands.

29. The data processing system of claim 8 wherein the setting of the condition code signifies an overflow condition resulting from the addition of or the substraction of the first and second operands.

30. The data processing system of claim 1 wherein said instruction sequence processing means includes means for processing a condition code-setting instruction and a branch instruction offset in time from said condition code-setting instruction whereby said branch instruction addresses a targeted instruction and wherein said targeted instruction is accessed if said condition code is set.

31. The data processing system of claim 30 wherein said means responsive operates as a function of the sign of the operands, of the type of arithmetic of the operands, and of the operation to be executed.

32. A data processing system having storage apparatus, instruction handling apparatus and instruction execution apparatus wherein the system performs data manipulations under the control of instructions having operation codes for specifying operations to be executed and having operand fields for identifying operands to be utilized in executing the operation codes, and where instructions are processed in segments where each segment has a duration equal to one or more clock cycles, and additional apparatus comprising, clock means providing clock signals which define clock cycles for controlling the data processing system, instruction sequence processing means for processing instructions including a branch instruction specifying one of a plurality of possible instruction streams to be taken in accordance with a condition code specified by said branch instruction, and including a condition code-setting instruction specifying operands to be utilized in executing the condition code-setting instructions, said instruction sequence processing means including a plurality of stages for storing instruction fields, means for sequentially stepping a plurality of said instructions through said stages with a time-offset between consecutive instructions, comparator means for comparing the operands specified by said condition code-setting instruction to form a comparison result, means responsive to the operation code of said condition code-setting instruction from one of said plurality of stages prior to execution of the operation specified by the operation code of said code-setting instruction in said instruction sequence processing means and to said comparison result in said comparator means for setting said condition code without the necessity of waiting for the execution of the operation specified by the operation code of said code-setting instruction.

* * * * *